(12) United States Patent
Stone et al.

(10) Patent No.: US 7,302,740 B1
(45) Date of Patent: Dec. 4, 2007

(54) HIGH TENSION LINE CLAMP WITH QUICK RELEASE MECHANISM

(76) Inventors: Peter Stone, 9000 Shore Rd., Apt. E14G, Brooklyn, NY (US) 11209; Anton P. Vasyukevich, 1015 Arcadia Ave., #17, Arcadia, CA (US) 91007

(*) Notice: Subject to any disclaimer, the term of this patent is extended or adjusted under 35 U.S.C. 154(b) by 18 days.

(21) Appl. No.: 11/092,030

(22) Filed: Mar. 29, 2005

(51) Int. Cl.
  *F16G 11/00* (2006.01)
  *F16G 11/04* (2006.01)
(52) U.S. Cl. .............. 24/136 R; 188/65.1; 188/65.2; 182/5
(58) Field of Classification Search .............. 24/115 F, 24/134 KB, 134 R, 134 L, 132 AA; 182/5; 188/65.1, 65.4, 65.2
See application file for complete search history.

(56) References Cited

U.S. PATENT DOCUMENTS

| | | | |
|---|---|---|---|
| 15,279 A | 7/1856 | Boynton | |
| 152,270 A | 6/1874 | Bird | |
| 253,058 A | 1/1882 | Hutchins | |
| 536,729 A | 4/1895 | Linden | |
| 842,329 A | 1/1907 | McClean | |
| 1,410,162 A | 3/1922 | Cadwell | |
| 1,451,359 A | 4/1923 | Campbell | |
| 1,496,603 A | 6/1924 | Rothenberger | |
| 1,710,697 A * | 4/1929 | Gilbert | .................. 24/134 KB |
| 1,913,032 A | 6/1933 | Krause | |
| 2,238,386 A | 4/1941 | Frank | |
| 2,435,447 A | 2/1948 | Kortum | |
| 2,869,209 A | 1/1959 | Kautzky | |
| 3,045,306 A | 7/1962 | Taylor | |
| 3,472,343 A * | 10/1969 | Williams et al. | ........... 188/65.1 |
| 3,692,277 A * | 9/1972 | Schwartz et al. | ......... 254/29 A |
| 3,835,507 A | 9/1974 | Richards | |
| 4,148,224 A * | 4/1979 | Craig | .................... 24/134 KB |
| 4,166,427 A | 9/1979 | Bullard | |
| 4,278,042 A * | 7/1981 | Lindquist | ............... 24/134 KB |
| 4,425,862 A | 1/1984 | Hirsch | |
| 4,450,603 A | 5/1984 | Hirsch | |
| 4,725,088 A * | 2/1988 | Mank | ......................... 294/90 |
| 5,152,241 A | 10/1992 | Brown | |
| 5,392,496 A * | 2/1995 | Johnson | .................... 24/136 R |
| 5,531,297 A * | 7/1996 | Pipan | ........................ 188/65.1 |
| 6,295,700 B1 | 10/2001 | Plzak | |

FOREIGN PATENT DOCUMENTS

GB 2169993 * 7/1986

* cited by examiner

Primary Examiner—Robert J. Sandy

(57) ABSTRACT

A line clamp or stopping apparatus includes a housing one part of which serves to clamp or wedge a line subjected to high tension upwards of ten tons. The other part of the housing controls the first part. An eccentric wheel rotates freely within the first part in response to movements of the line and is guided within a space or gap between the wheel and a braking element. The control includes a toggle joint that applies significant forces on the brake when a safety is removed and a control lever is in a neutral or locking position. When the control lever is moved to the open or unlock or release position the toggle joint snaps and released the brake to increase the gap in the line receiving space to allow free movement of the line. A hydraulic brake can be used in place of the mechanical toggle joint.

12 Claims, 6 Drawing Sheets

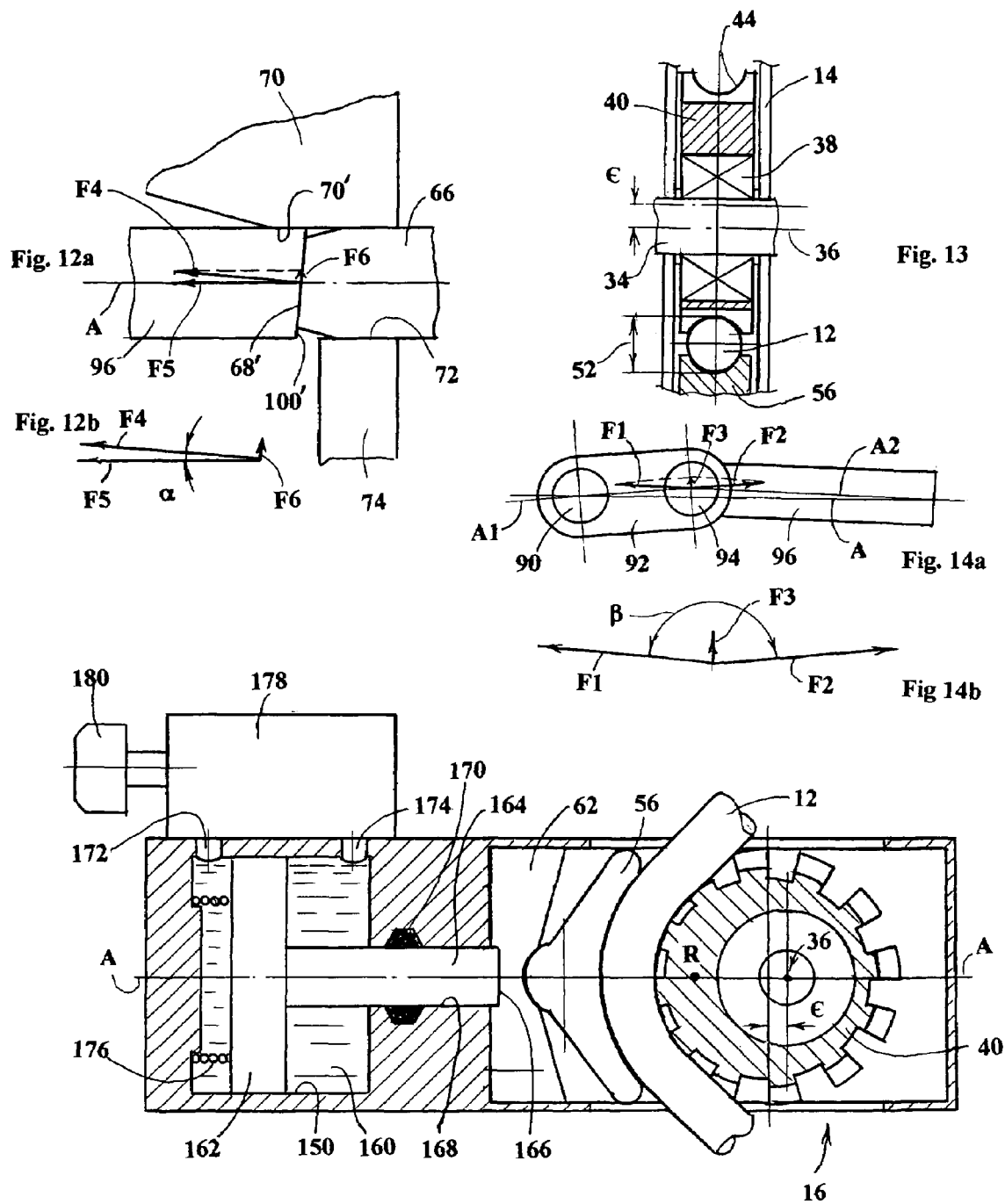

HIGH TENSION LINE CLAMP WITH QUICK RELEASE MECHANISM

BACKGROUND OF THE INVENTION

1. Field of the Invention

The present invention generally relates to line clamping devices and, more specifically, to a high tension line clamp with a quick release mechanism.

2. Description of the Prior Art

It is frequently necessary to control a line by either arresting or stopping its motion or releasing it. On sailing vessels, for example, lines are used to raise and control sails and other operating units often under heavy loads. The same line may first be lightly loaded, and then as the tension required increases, the use of a winch is necessary. To allow one winch to be used for several lines, of the same or varying sizes, a sheet or line stopper is provided for each line. When out of engagement, the line stopper permits the line to run in both directions. In an engaged position, the line runs under light pressure in one direction only. It is therefore possible to haul a line in by hand without slipping as a self-locking action prevents line movement of the line in the opposite direction. As the load increases, a winch is used to set the line in the desired position as control becomes difficult by hand. With the line stoppers presently available, although the line may be taken off the winch and still be held by the line stopper, it is impossible to release the line without the use of a winch to hold the load while the line stopper is released. In sailboat racing, putting a line on a winch in order to effect a release of the line stopper is time consuming as well as tying up a winch which may be necessary for another control function. Also, the line stopper tends to contact and abrade a line on its release under load even using a winch to help effect such a release.

The prior art is replete with braking mechanisms for arresting or releasing a line under tension. As suggested, such lines are frequently used to hoisting and trimming of sails in which the line may be subjected to tensions ranging from low to extremely high tensions up to and even exceeding ten tons.

A common mechanism for arresting a line includes a cylindrical surface mounted to exhibit an eccentric braking surface in relation to a fixed abutment surface so that movement of the eccentric braking surface can vary or adjust a gap through which the line is guided. When the gap is sufficiently reduced, the line is wedged between the braking and abutment surfaces. Normally, continued tension on the line in the same direction increases the wedging effect and thereby the lock on the line. One example of such a rope holding device is disclosed in U.S. Pat. No. 3,835,507, which shows a cylindrical cam mounted for rotation on a pin to cause the circumferential gripping surface to provide a variable line gap when the cam is rotated. A U-shaped base member having legs with a pivot pin mounted therein is adapted to be anchored on a sailboat. A cam mechanism includes an inner element having a handle attached thereto which is eccentrically mounted for pivotal movement around the pivot pin. A movable outer element is positioned for pivotal movement and a rotational movement on the eccentrically mounted inner element. One or more springs are mounted between the inner and outer elements of the cam mechanism which are acted on when relative movement takes place between the elements. The spring is compressed when the handle is pivoted placing the outer member in locking engagement with the line in the load direction which locking action is increased with increasing load; while allowing the outer member to rotate or float over the line in the other direction. Each release of the load direction is effected by raising the handle. The line stopper can be released under heavy load because the outer element holding the line rotates in the same direction the line is running, the line will not be abraded thereby limiting line wear. The line stopper may be mounted either vertically or horizontally.

A disadvantage of existing rope holding or stopping devices is that they require substantial forces to be applied to release the line after it has been locked. Thus, once the line tension causes the eccentric cam surface to close a gap for the line and wedges it to stop it and lock it continued tension on the line in the same direction tends to decrease the gap even further with attendant increased holding pressure on the line. Releasing the line from its wedged condition can be effected by reversing the process and increasing the size of the gap through which the line extends. Clearly, this can be done in one of two ways. One or the other of the wedging surfaces must be moved away from the other opposing surface so that the gap is increased and the line is again permitted to move. As suggested, the prior art devices have typically used a fixed abutment surface that always remains stationary. Therefore, the only way to increase the gap is to move the surface on the eccentric cam in a direction opposite to the initial direction that caused the cam to lock the line. However, this is not always an easy or quick task. The reason for this is that the tension in the line can be so high that applying an opposing tension on the other end of the line may be difficult if manually attempted. Application of a tension greater than the tension at the opposing end of the line could rotate the eccentric cam in the releasing position with attendant increase in the gap. This approach, however, becomes impractical when the tensions in the line are extremely high. For this reason, a winch must at times be used to overcome very high tensions in the line in order to reverse the direction of movement of the eccentric cam surface and thereby the size of the line receiving gap. In some cases, a handle or lever is used that is attached to the eccentric cam that allows a user to obtain mechanical advantage in moving or rotating the eccentric cam to an unlocking position. See, for example, U.S. Pat. No. 4,425,862 for a sail line stopper that uses a handle that cooperates with the cam. Unlocking the line using the stopper still requires significant effort.

SUMMARY OF THE INVENTION

Accordingly, it is an primary object to provide a line clamping device that does not possess the disadvantages of like prior art devices.

It is another object of the invention to provide a line clamping device that is simple in construction and economical to manufacture.

It is yet another object of the invention to provide a line clamping device that is easy to use.

It is still another object of the invention to provide a line clamping device that allows easy and rapid clamping of lines that are tensioned upwards of ten tons.

It is a further object of the invention to provide a line clamping device that requires little or no manual force to control lines subjected to significant tensions.

It is still a further object of the invention to provide a line clamping device of the type under discussion that can be set or programmed to control a line under tension.

In order to achieve the above and other objects a line clamping device includes clamping means for selectively clamping a line subjected to tension. Releasing means is provided for releasing the line by application of an insignificant force substantially unrelated to the tension in the line. Preferably, the release of the line is rapid and with little or no force manual force applied.

BRIEF DESCRIPTION OF THE DRAWINGS

This invention, together with further aspects, features and advantages thereof will be more clearly understood by considering the following description in conjunction with the accompanying drawings in which like elements bear the same reference numerals throughout the several views.

FIG. 1 is a top perspective view of a line clamping device in accordance with the present invention, showing a line to be controlled extending there-through;

FIG. 12a illustrates a modified version of the toggle linkages shown in FIGS. 3-11 that provides a force component, when in the locked condition, that prevents the device from inadvertently moving from the locked to an unlocked condition.

FIG. 12b is a force diagram of the forces generated with the modification shown in FIG. 12a;

FIG. 13 is a partial cross-section through the device shown in FIG. 3, taken along line 13-13;

FIG. 14a shows the levers or links forming the toggle joint;

FIG. 14b is a force diagram showing the forces generated at the pivot pin of the toggle joint and the component that promotes or aids the toggle mechanism to snap to the releasing position; and FIG. 15 illustrates another embodiment of the line clamping device of the invention in which the toggle joint wedging mechanism is replaced by a hydraulic device.

DESCRIPTION OF THE PREFERRED EMBODIMENTS

Figure 1:
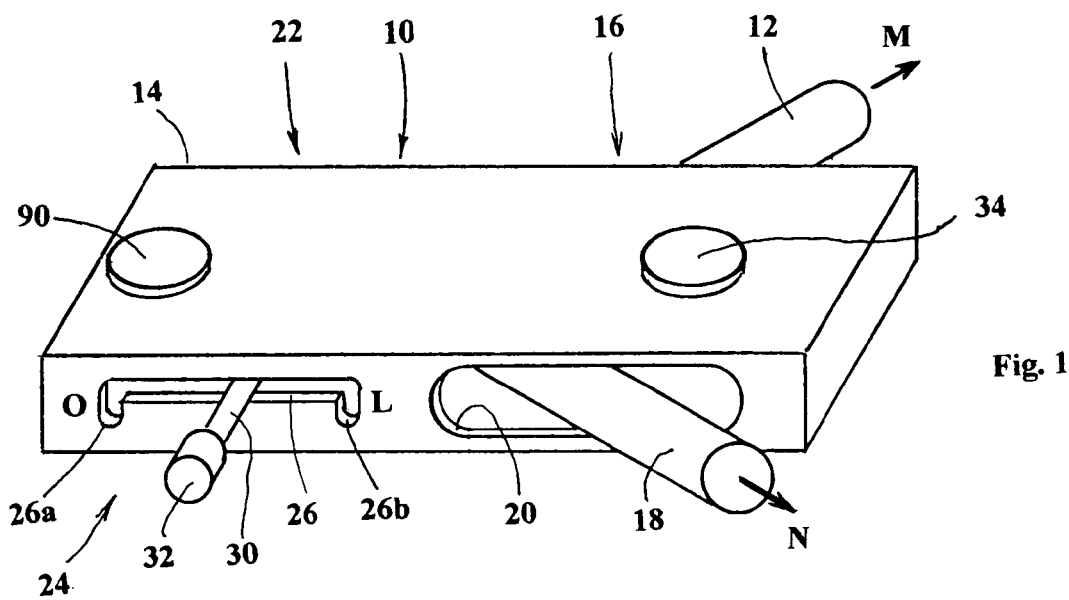

Referring first to FIG. 1, a line clamping or locking device in accordance with the invention is generally designated by the reference numeral 10.

The device 10 serves to selectively clamp, lock, stop or arrest a line 12 while it is under tension and moving in either direction M or N.

The device 10 includes a housing or case 14 shown to be relatively flat and elongate in one direction in the general plane of the housing. However, it will be evident that the specific configuration of the housing or case is not critical and any convenient or suitable shape or configuration may be used that is consistent with the mounting and operation of the elements or components contained therein to be described.

Generally, the housing or case or chassis 10 includes or defines two sections. The first is a wedging or locking section 16 through which the line 12 to be controlled enters and exits the housing through suitable openings 20. The other part of the housing defines a control portion 22 which controls the actions that take place in the wedging or locking section 16. The control portion 22 includes a manual control mechanism 24 that extends through a slot 26 and includes a rod or shaft 30 that extends through the slot 26 and may be provided with a knob or gripping portion 32. The slot 26 is generally straight and provided with right angle recesses or detents 26a and 26b at the two respective ends of the slot, the recess 26a serving as a line releasing position for the rod 30 that promotes releasing of the line 12 while the recess 26b serving as a locking position for the rod that promotes the clamping or locking or stopping of the line, as will be more fully described. It will become evident that the specific configuration of the slot 26 and the use of recesses or detents 26a, 26b is not critical and any other and suitable mechanism, electro-mechanism or circuit may be used to establish and maintain the desired condition of the control portion 22.

Figure 2:
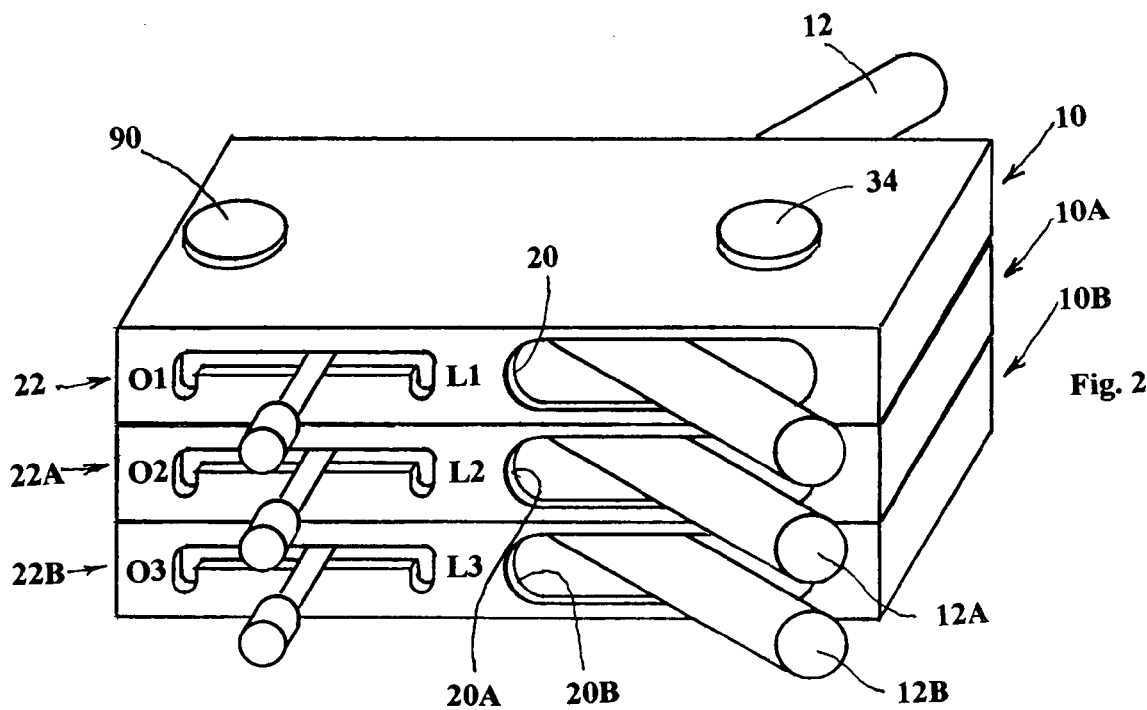
FIG. 2 is similar to FIG. 1 but showing a plurality of like clamping devices stacked to accommodate and control a plurality of lines.

In FIG. 2, a plurality of clamping devices 10, 10A and 10B are shown stacked to make efficient use of space while accommodating three lines 12, 12A and 12B. Each of the devices may be similarly constructed and, accordingly, may be provided with independent control portions 22, 22A and 22B. These units may be secured to each other in any conventional way. The construction and operation of each of the units is the same and the description that follows in connection with FIG. 3 is applicable to each of the units.

Figure 3:
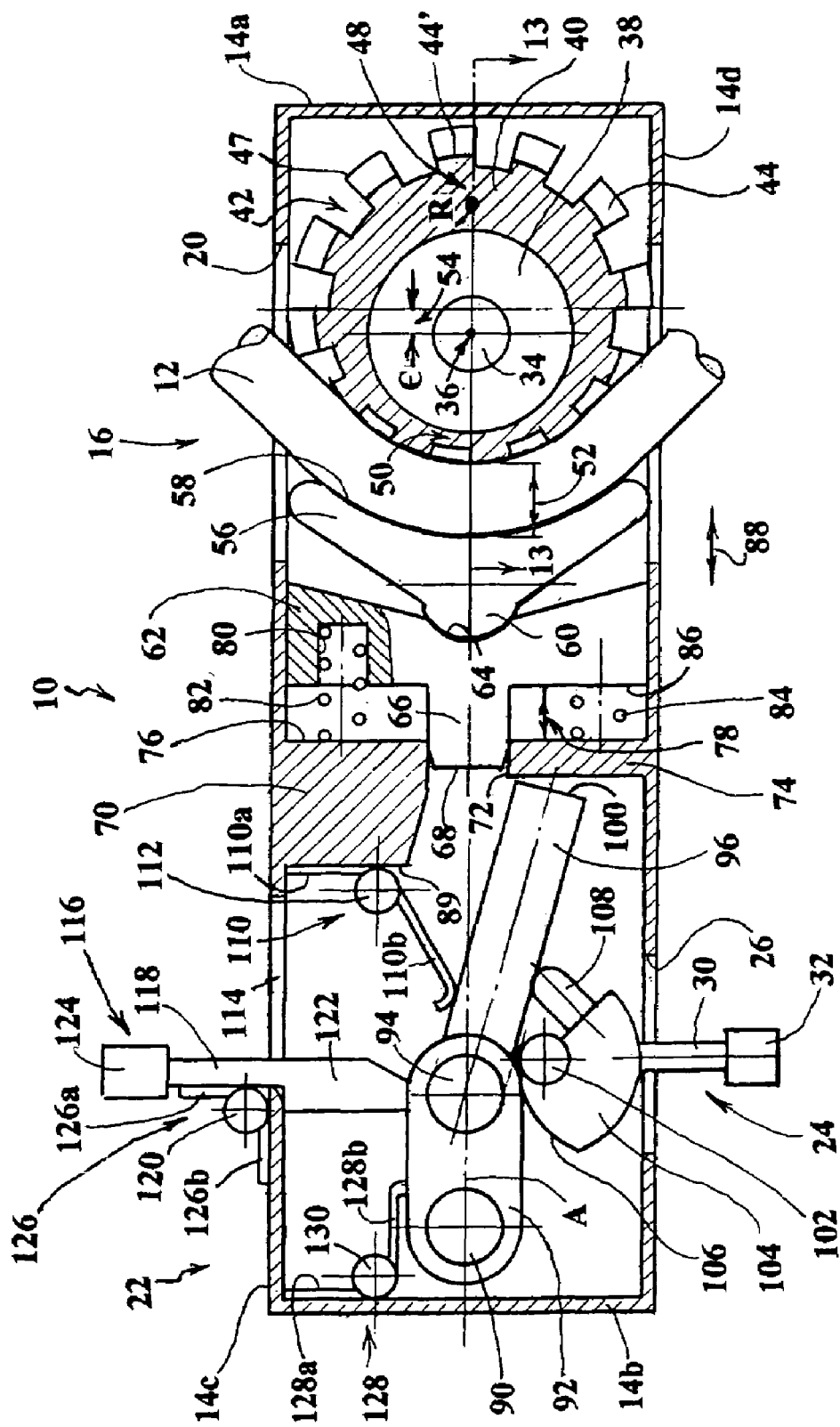
FIG. 3 is an enlarged cross-sectional view of the clamping device shown in FIG. 1, taken along a longitudinal plane coextensive with the plane in which the line is arranged, showing a condition in which the line is free to move through the device in either direction and with the eccentric wheel positioned to minimize braking or locking of the line.

Referring to FIGS. 3 and 12, one preferred embodiment, by way of example, will now be described in detail. The wedging or locking part 16 of the clamping device includes a fixed pin or rivet 34 that, referring to FIG. 2, may also be used to secure two or more of the units to each other. The pin or rivet 34 is fixed to the upper and lower walls of the housing 14, as viewed in FIG. 1, and defined a center or "axis" of rotation 36. Rotatably mounted on the pin or rivet 34 is a bearing 38 that can freely rotate about the fixed center or "axis" 36. Mounted on the bearing 38 is an eccentric wheel 40 whose "axis" is offset from the center or "axis" 36 an amount C. The eccentric wheel is preferably provided with notches 42 about its outer circumference forming arcuate surfaces 44 in the resulting teeth or projections 47. The depth of the arcuate surfaces define a radially innermost dimension 44' for accommodation the generally round or circular cross-section of the line 12. A reference point 48 designated "R" is shown to facilitate the description of the wheel 40 and its operation. As will be clear, with this arrangement, the wheel 40 has a maximum radial dimension at 48 along the radius passing through the point R while the minimum dimension is at the diametrically opposite side at 50.

As will become evident, the stopping, locking or clamping action on the line 12 occurs when it is wedged within gap or space 50 between the wider side 48 of the wheel 40 and an opposing surface to be described. The eccentricity C, generally corresponds to the differences between the effective radii extending through the wide and narrow portions of the wheel 48, 50, respectively.

A shoe or pad 56 forms the opposing surface 58 that with the wheel 40, defines the gap 50. It will be clear that the gap 50 may be decreased by rotating the wheel 40 from the position shown in FIG. 3 and minimized when the wheel has rotated 180°. Also, the gap 50 may be decreased by moving the surface 58 to the right, as viewed in FIG. 3. The gap 50 may, correspondingly, be increased by reversing these movements.

The shoe or pad 56 is provided with a heel 60 that engages a piston 62, by being received or in contact with an axial conforming recess 64. However, different arrangements can be used to couple the axial movements of the piston 62 to the shoe 56.

The piston 62 is dimensioned to be slidably mounted for axial movements between end walls 14a, 14b, and is provided on the side closest to the end wall 14b with an axial shaft 66 defining an end surface 68 facing the control portion 22 and slidable received within an axial channel 72 in a transverse wall 70. The wall 70 is generally annular with the central or axial hole 72, with the axial thickness of the wall 70 not necessarily uniform as evidenced by the thinner wall portion 74 as compared to the upper wider portion. It will also be clear that the wall need not be annular but separate wall portions or transverse members may be provided as long as they perform the same or similar functions to the walls 70, 74.

The wall 70 exhibits a transverse surface 76 facing the piston 62 and spaced from the facing surface of the piston a distance 78 in which biasing members may be positioned to bias or urge the piston 62 and therefore the shoe 62 to move towards the right, as viewed in FIG. 3 or towards the eccentric wheel 40 to thereby lessen the gap 52. Towards this end, the piston may be provided with an axial cavity 80 in the direction of the surface 76 with a compression spring extending there between as shown. Similarly, a compression spring 84 may be lodged between the surface 76 and the surface 86 of the piston as shown. As indicated, both springs 82, 84 will urge the piston 62 and the shoe 56 to move towards the wheel 40 to normally tend to wedge the line, with the position of the wheel 40 permitting, and allowing the piston 62 to reciprocate along the axial direction 88 when there is no interference from the control section 22. Thus, as the line 12 is pulled in the upward direction M, as viewed in FIG. 3, the eccentric wheel 40 rotates about the center or "axis" 36 causing the line and the shoe 56 in contact with it to likewise reciprocate or fluctuate along the axial direction 88 with the wider part 48 of the wheel urging the line and shoe towards the left against the action of the springs 82, 84.

Mounted at the other end of the housing 14 is a fixed pin or post 90 that can be in the form of a rivet that serves as a pivot, as to be described, and can also be used to secure two or more of the devices, as suggested in FIG. 2. Pivotally mounted at one end on the post or pin 90 is a link 92 that has the other end thereof pivotally secured to a moveable pin 94 to a locking rod of bar 96. The rod 96 has an end surface 100 that can substantially correspond to the surface 68 so that these two surfaces can contact and abut against each other, as to be described.

Normally, with no other elements, the link 92 could pivot about the post 90 and the rod 96 could pivot about the pin 94. However, a post 102 is provided in proximity of the link 92 as shown, with a cam 104 pivotally mounted on the post 102 controlled by the control lever 24 and having a cam surface 106 configured to either maintain the link 92 aligned with the "axis" A or displaced slightly from that "axis", as to be described. Also, there is also provided a spring loaded plunger or pusher 108 mounted on the cam 104 and arranged to either allow free pivotal movements of the locking rod 96 about the pin 94 or to urge the locking rod to move into alignment with the link 92 and the "axis".

A leaf or coil spring 110 is provided on a post 112 proximate to the wall 70 that has one leg 110a abutting against the surface 89 and the other leg 110b having its end contacting and pushing against the locking rod 96 to urge it in a clockwise direction, as viewed in FIG. 3.

The side wall 14c is provided with an opening 114 through which a safety lever 116 can move. The safety lever 116 has a rod 118 pivotally mounted on a post 120 with one end 122 of the lever being dimensioned to be received within the housing 14 and into contact with the end of the link 92 on which the pin 94 is mounted. A knob or gripping member 124 may be provided to facilitate manual gripping and control of the rod 118. When the rod is positioned as shown in FIG. 3, generally transverse to the "axis" A it is dimensioned to abut against the link 92 and maintain it aligned along the "axis" A or at least prevent it from rotating in a counter-clockwise direction beyond the "axis" aligned position. Thus, when the safety lever 116 is in the position shown in FIG. 3, the link must remain aligned with the "axis" A irrespective of the pushing action by the cam surface 106 on the control lever 24.

A leaf or coil spring 126 is mounted on a post 120 as shown with one of the legs 126a acting against the upper part of the rod 118 proximate to the knob 124 and the other leg 126b acting against the outer surface of the side wall 14c so that the spring 126 normally tends to urge or bias the rod 118 in a clockwise direction about the post 120, as viewed in FIG. 3. Thus the spring 126 normally urges or biases the safety lever 116 to move to the "safety" position in which the link 92 is maintained in the position shown.

A further spring 128, also shown as a leaf or coil spring, is mounted on a post 130 with one leg 128a abutting against the inner surface of the end wall 14b while the other leg 128b acts directly on the link 92 normally urging the link 92 to rotate about the fixed post 90 in a clockwise direction into contact with the cam surface 106.

The operation of the clamping devise will now be described in connection with FIGS. 3-14. In FIG. 3, the control portion 22 is set to allow the line 12 to move in either direction M or N. As the line moves through the devise the frictional engagement of the line with the wheel 40 causes the wheel to rotate either in a clockwise direction, if the line is moving in the direction M or in a counter-clockwise direction if the line moves in the opposite direction N. For purposes of the illustration it will be assumed that the line is tensioned and moves in the direction M. With the wheel 40 initially in the position shown in FIG. 3, the wheel 40 will initially move to the position shown in FIG. 4, point R having moved 90°, and subsequently to the position shown in FIG. 5, in with the point R has moved another 90° for a total of 180°. In doing so, the eccentric wheel has urged the line and the shoe 56 and the piston 62 to move to the left against the actions of the springs 82, 84. However, because the piston shaft 66 can slide axially to the left without any resistance the gap or space 52 for the line remains substantially the same and the line is not wedged, stopped or arrested in any way. As the line keeps being pulled through the wheel 40 continues to be rotated and the eccentric nature of the wheel causes the line portion passing through the gap or space 52 to oscillate or reciprocate along the direction 88 of the "axis" A. This will continue until a decision is made to stop, arrest or clamp the line.

Figure 4:
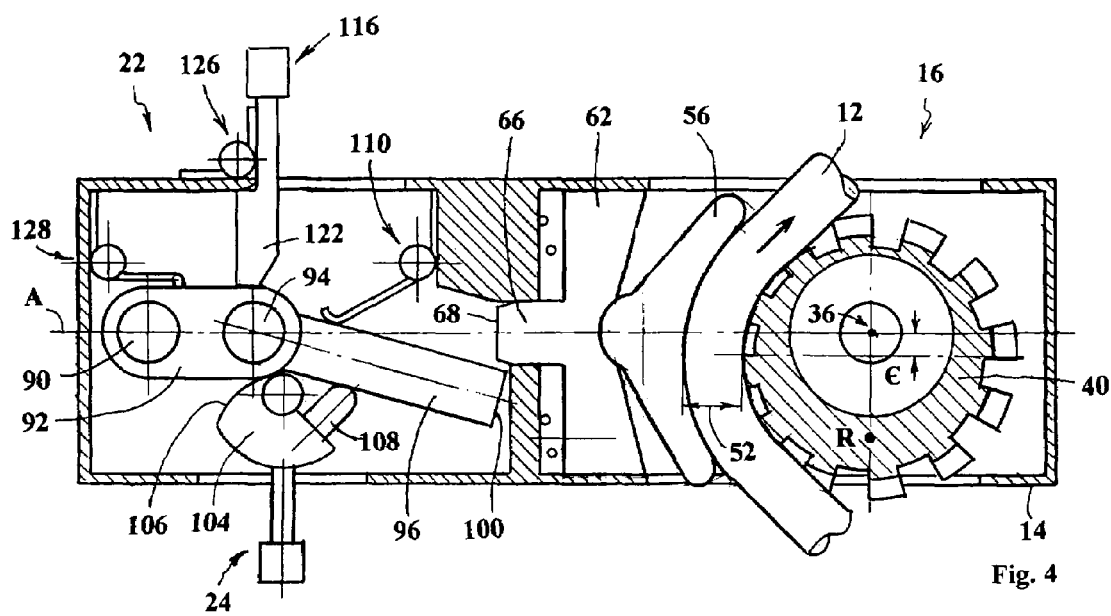
FIGS. 4 and 5 are similar to FIG. 3, but showing the eccentric wheel rotated 90° and 180°, respectively, from the position shown in FIG. 3.
Figure 5:
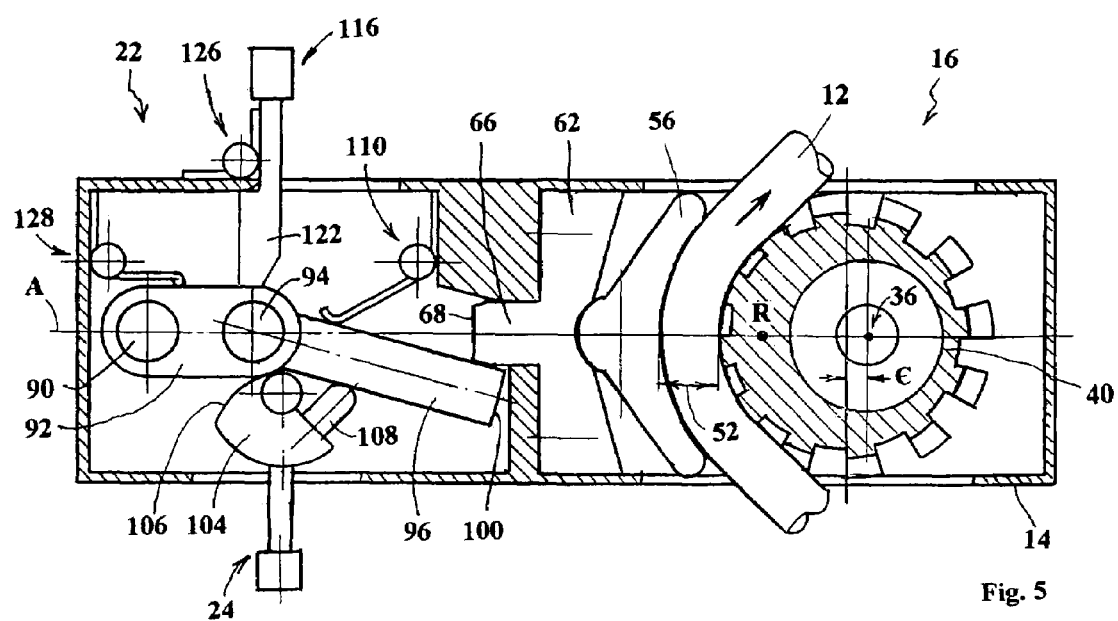
Figure 6:
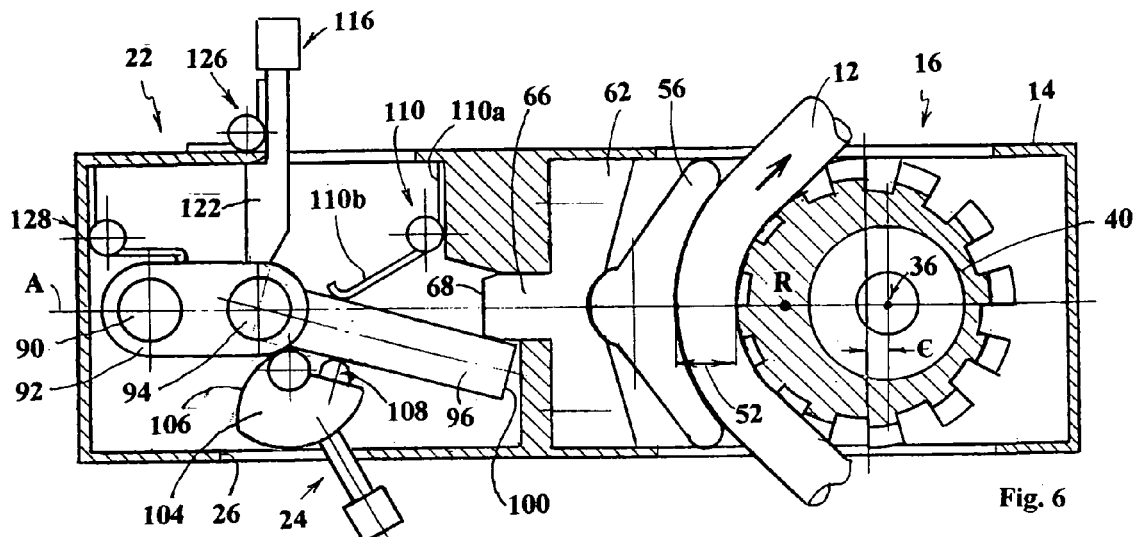
FIG. 6 is similar to FIGS. 3-5 but showing a manual control moved to the locking position while the eccentric wheel is in the 180° position.
Figure 7:
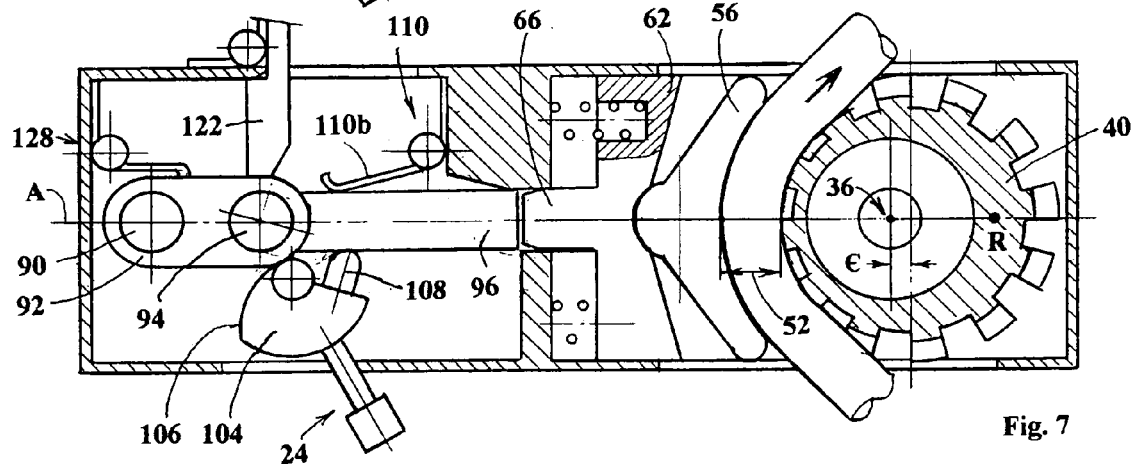
FIG. 7 is similar to FIG. 6 in which the eccentric wheel has moved to the original reference or 0° position to enable locking.
Figure 8:
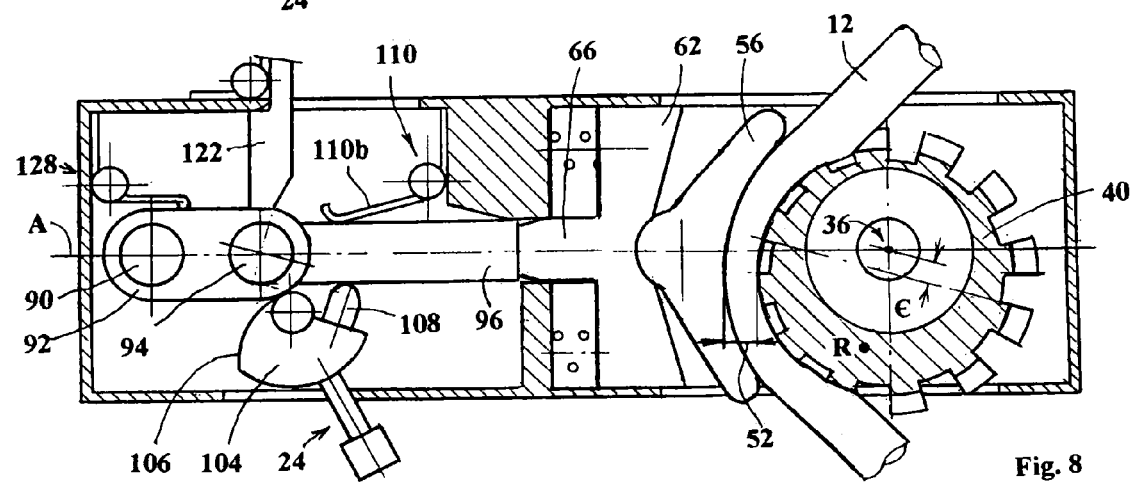
FIG. 8 is similar to FIG. 7 except that the eccentric wheel has moved to a position between 90° and 180° to wedge or lock the line against further movement in the direction in which it had been moving causing the eccentric wheel to rotate in a clock-wise direction as viewed in the Figure.

While the control lever 24 is in a "neutral" position in FIGS. 3-5, a user will have moved the lever to the lock or stop position in FIGS. 6-8, urging the cam 104 in a counter-clockwise direction and causing the plunger or pusher 108 to apply a sufficiently significant biasing force on the locking rod 96 to tend to rotate it in a counter-clockwise direction against the action of the leaf or coil spring 110. In FIG. 6, although the resiliently-mounted plunger or pusher 108 is pushed into the cam 104 and a significant force is applied to the locking rod 96 the latter cannot initially respond to the force of the control lever 24 because of the initial extended position of the shaft 66 of the piston 62 which blocks the continued counter-clockwise rotation or pivoting of the locking rod. However, as soon as the eccentric wheel 40 rotates to move reference point R from the left to the right side of the center 36 the shoe 56 and the piston 62 return to their positions shown in FIG. 3 and the continued biasing action of the plunger or pusher 108 moves the locking rod 96 into alignment with the "axis" A and into a co-extensive or co-axial alignment with the shaft 66. The safety lever 116 prevents the locking rod to move beyond that aligned position.

It will be appreciated that as soon as the locking rod 96 is moved to the aligned position along the "axis" its end surface 100 becomes an interfering surface that prevents the shaft 66 and the piston 62 and the shoe 56 from unrestricted movements to the left, as viewed in the figures. Now, as the eccentric wheel 40 rotates from the position shown in FIG. 7 to the position shown in FIG. 8, the eccentricity of the wheel again urges the line 12, the shoe 56 and piston 62 to the left as they try to follow the increasing distance between the center 36 and the outer circumference of the wheel. However, because the locking rod is in place in alignment with the shaft 66 is stopped and the continued rotation of the wheel caused an increasing reduction in the size of the gap or space 52. This causes a wedging effect and the line is abruptly stopped when the wheel is rotated to bring the point R between the positions shown in FIG. 8 and FIG. 6. (90° and 180°). As will be understood to those skilled in the art, the link 92 and the locking rod 96 together form a toggle joint. Such a joint, formed of two arms or links, can be used to implement a "snap-action" when the links are moved out of alignment. However, when in alignment such arms or links can be used to apply significant pressures at both ends by forcing the arms or links into straight alignment when the ends of the arms or links are constrained or fixed in place. Here, one end of the link 92 is fixed because mounted on fixed post 90, and the other end at surface 100 of the locking rod 96 likewise becomes constrained by the shaft 66. Therefore, the system can absorb substantial internal longitudinal or axial pressures without altering the state of the mechanism.

Figure 9:
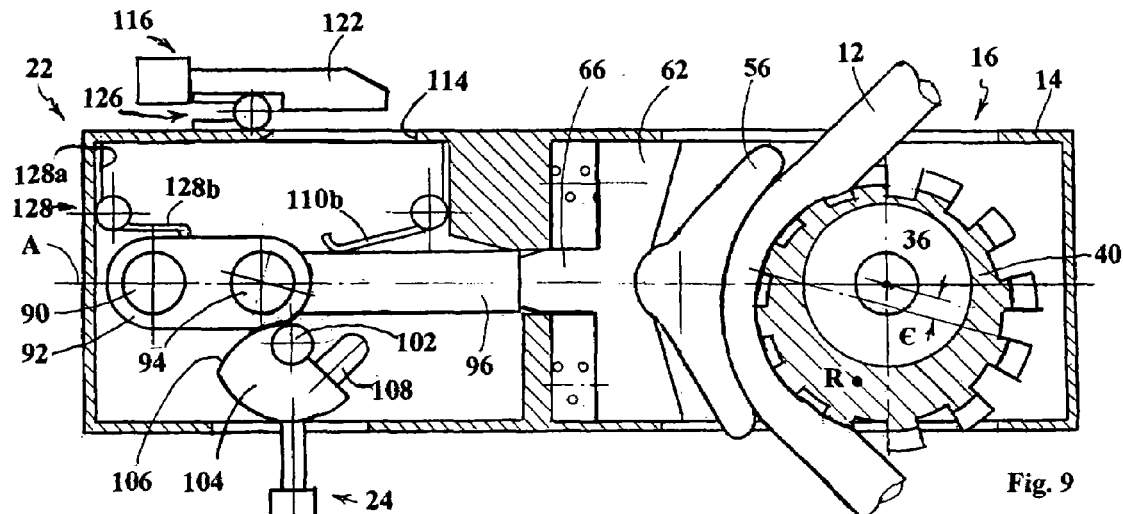
FIG. 9 is similar to FIG. 8 but showing a safety moved to a position that allows the device to become unlocked for eventual release of the line.
Figure 10:
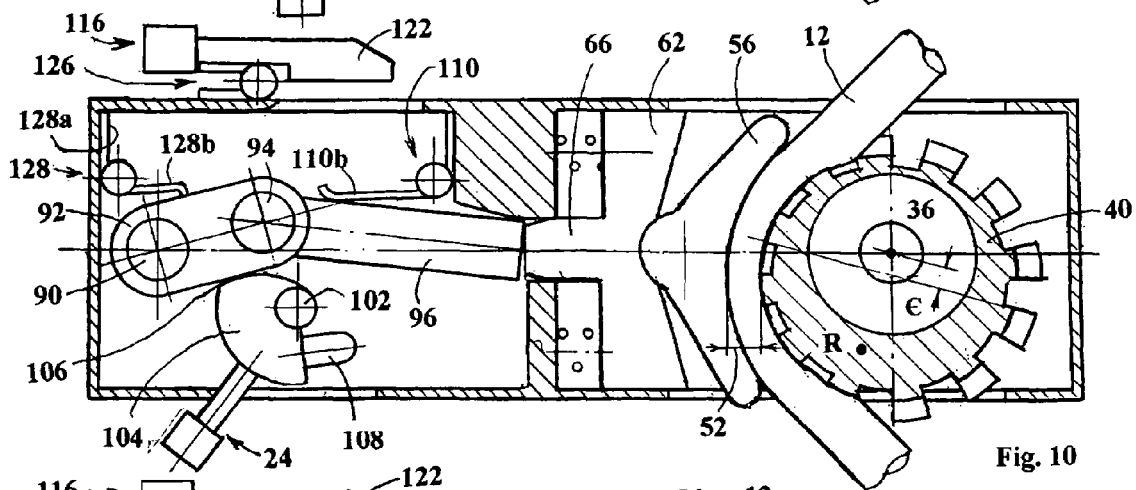
FIG. 10 is similar to FIG. 9 but showing the manual control lever moved to a line unlocking or releasing position and showing the initial phases of the release of the line.
Figure 11:
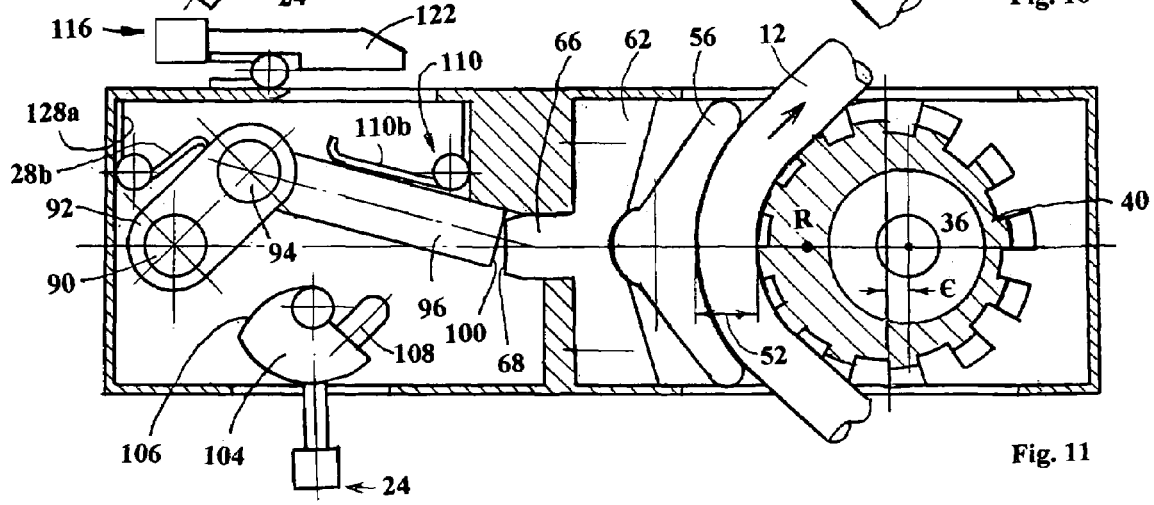
FIG. 11 is similar to FIG. 10 but showing a further progression of the unlocking or releasing of the line and the return of the control lever to the neutral position.

In FIG. 9, the safety lever 116 has been moved by counter-clockwise rotation to remove the locking end 122 out of the housing 14 and out of proximity of the link 92. Now, by manually moving the control lever 24 to the open or unlocking or unclamping position, as shown in FIG. 10, the cam surface 106 causes the link 92 to rotate in a counter-clockwise direction and breaking the alignment of the link 92 and the locking rod 96. The resulting "toggle" action caused the levers to snap out of alignment due to the internal forces in the system and without application of any meaningful forces by the user. These strong forces stored in the system are sufficient to overcome the biasing forces of the springs 110 and 128, and the locking rod 96 can move sufficiently to the left move the surface 100 out of contact with the surface 68 of the shaft 66 and the gap or space 52 is again allowed to enlarge or increase and the line allowed to move in the same direction to remove any wedging action on the line. As soon as the wheel is again permitted to rotate to the position shown in FIG. 3, and the control lever is again moved to the "neutral" position shown in FIG. 11, the springs 110 and 128 urge the link 92 and the locking rod 96 to clear the retracted shaft 66 and return to the unlocked positions shown in FIG. 3. This may again be repeated by moving the safety lever to the safety position shown in FIG. 3 and the control lever moved to the locking position shown in FIG. 6.

It will be appreciated that the locking and unlocking of the line can be easily and rapidly effected by a user by exerting forces that are insignificant and have no bearing to the substantial tensions in the line that can be upward of ten tons.

In FIGS. 12a and 12b a modified design is shown that prevents the unit, when in a locked condition, from inadvertently snapping out of alignment by slightly and thereby releasing the line even when such release is not desired. This safety feature is achieved by inclining the surfaces 68' and 100' of the shaft 66 and the locking rod 96, respectively, out of a plane that is ninety degrees or normal to the "axis" A. The deviation out of such a normal plane is not critical but may be within the range of 0.5°-1.0°. This creates a force component F6 that holds the locking rod 96 in a locked position even for small a angles of less than one degree and produces axial and normal force components F5 and F6. The force component F6 pushes the locking rod 96 against the surface 70' of the wall 70 that prevents the locking rod 96 from accidentally moving downwardly (as viewed in the Figures) out of blocking axial alignment that would release the line 12. Because of the large magnitudes of F5 even small angles of a creates significant holding forces F6.

The toggle action or mechanism is one that can be used with the invention as it can withstand tremendously high forces. Referring to FIGS. 14a, 14b the actions and forces that come into play can be seen. When the link 92 and the locking rod 96 are in alignment the forces F1 and F2 counter each other and no matter how high they are they cancel each other and they remain aligned. As soon as there is some instability and even the slightest break in the alignment, even at angles of β close to 180 a force component F3 is formed that creates further instability and enhances the snap action to even greater misalignment. With the safety lever 116 out of the safety position such forces could cause the toggle to snap and the line rapidly released.

When there is no emergency condition that requires immediate release of the line 12 under high tension conditions but it is desired to make an adjustment of the line 12, the control lever 24 can be moved to the neutral position as shown on FIG. 3. The line 12 can be pulled in the opposite direction (direction "N" in FIG. 1) until the FIG. 3 position of the wheel 40 is reached. In this position the force F6 will be zero and spring 110 will move the locking rod 96 out of the contact with the piston shaft 66. The shoes 56 and piston 62 will be able to move back and forth during on adjustment process. After necessary adjustment the control lever 24 can be moved to locking position. After the adjustment the force will be zero the line will be locked as shown on FIG. 8.

As suggested, the mechanical toggle mechanism is one way to effectively stop the piston 62 and therefore the shoe 56 from unrestricted movements the full or maximum stroke to the left or movements that correspond to the eccentricity of the wheel 40. However, other approaches are possible and contemplated. Thus, for example, referring to FIG. 15, a clamping device is shown in which the wedging part 16 is the same as in the previous embodiment. However, the stopping part has been changed, with the toggle arrangement replaced with a hydraulic system. Here, the housing includes a sealed chamber 150 filled with hydraulic fluid 160. A piston 162 is slidably arranged within the chamber to be moveable in a reciprocating fashion in the direction of the "axis" A. A shaft 164 is attached to and moves with the movements of the piston, the shaft 164 having an end surface 166 that corresponds to the surface 100 on the locking rod 96. The shaft 164 is slidably arranged within a bore 168 arranged along the "axis" and any suitable seal 170 may be provided to prevent fluid from escaping the chamber 150 into the chamber housing the piston 62. A compression spring 176 is arranged between the piston 162 and the end of the chamber 150 to urge the piston 162 and the shaft 164 to normally slide or move towards the right and likewise cause the piston 62 and the shoe 56 to follow. Two through holes 172, 174 communicate the chamber 150 with a control valve 178 that can be manually or electrically operated to regulate the flow of fluid from one side of the piston 162 to the other. When the valve 178 is open the fluid can freely flow from one side to the other as the piston 62 and the shoe 56 follow the contour of the eccentric wheel. However, as soon as the piston 162 and shaft 164 are locked in position in their right-most position (this can be effected by a suitable sensor) the movements of the shoe 56 and the piston 62 are restricted and wedging of the line can be effected as previously.

While manual controls have been described, it will also be understood that remote or wireless controls of the "blocking" elements can be used to thereby cause locking, wedging or stopping of the line by a remote user or even by a programmed controller that senses when such action should take place and a blocking element be interposed that will result in wedging or stopping of the line.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

The invention claimed is:

1. A line clamp comprising clamping means for selectively clamping a line subjected to tension; and control means for selectively actuating said clamping means in a clamping mode for clamping the line and for de-activating said clamping means for rapidly releasing the line in a releasing mode, said control means including a user-responsive element for selecting one of said clamping and releasing modes by application of a user force that is significantly less than and unrelated to the tension in the line, said clamping means including an eccentric wheel the outer periphery of which forms a line receiving space with a brake element that contacts the line that follows the movements of said eccentric wheel periphery in the releasing mode of said control means, said control means further comprising toggle means for restricting the movements of said eccentric wheel in the clamping mode of said control means and safety means for preventing said toggle means from snapping to a condition that changes the modes of said control means from clamping to releasing modes, said control means including cam means for destabilizing said toggle means when said safety means is released.

2. A line clamp as defined in claim 1, wherein said wheel is provided with notches each of which defines an arcuate surface that generally conforms to the shape of the line.

3. A line clamp as defined in claim 1, wherein biasing means are provided for urging said brake element to follow the contour or circumferential periphery of said wheel.

4. A line clamp as defined in claim 1, further comprising biasing means for preventing said toggle means from restricting the movements of said brake in the de-activated condition of said control means.

5. A line clamp as defined in claim 1, wherein said toggle means is arranged to prevent a destabilizing force tending to inadvertently result in a snap action when said safety means is removed.

6. A line clamp as defined in claim 5, wherein said toggle means includes an active surface arranged to abut against said clamping means and arranged at a predetermined angle in relation to the direction of movements of said clamping means that creates, when in a locked condition, a force component that tends to counter or negate a potentially destabilizing force to thereby prevent inadvertent snap action when said safety means is removed.

7. A line clamp as defined in claim 1, wherein said eccentric wheel is mounted on a bearing.

8. A line clamp as defined in claim 1, wherein said control means includes hydraulic means.

9. A line clamp as defined in claim 1, wherein said control means is actuatable by user means that can be gripped or engaged by the user.

10. A line clamp as defined in claim 1, wherein a plurality of line clamps are provided each for controlling another line.

11. A line clamp as defined in claim 10, wherein said plurality of line clamps are stacked proximate to each other.

12. A line clamp as defined in claim 1, wherein said clamping means and control means are capable of substantially stopping and releasing a line subjected to high tensions on the order of ten tons.

* * * * *